US008498754B2

(12) United States Patent
Hasegawa et al.

(10) Patent No.: US 8,498,754 B2
(45) Date of Patent: Jul. 30, 2013

(54) ONBOARD APPARATUS, NAVIGATION SYSTEM, AND METHOD FOR SETTING DISPLAY SCREEN (75) Inventors: Shinichi Hasegawa, Kanagawa (JP); Takumi Arie, Kanagawa (JP); Hiroshi Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 1281 days.

(21) Appl. No.: 10/822,072

(22) Filed: Apr. 8, 2004

(65) Prior Publication Data

US 2004/0254690 A1 Dec. 16, 2004

(30) Foreign Application Priority Data

Apr. 10, 2003 (JP) .................................. 2003-106348

(51) Int. Cl.
*G05D 1/00* (2006.01)

(52) U.S. Cl.
USPC ............... 701/1; 701/400; 702/183; 340/500; 439/620.21

(58) Field of Classification Search
USPC ...... 701/36, 1, 400, 33; 342/357.09; 702/183; 340/500; 439/620.21
IPC ........................................................ G05D 1/00
See application file for complete search history.

(56) References Cited

U.S. PATENT DOCUMENTS

| | | | |
|---|---|---|---|
| 4,567,756 A * | 2/1986 | Colborn ..................... 73/114.61 |
| 5,374,917 A | 12/1994 | Hoffman et al. |
| 5,552,984 A | 9/1996 | Crandall et al. |
| 5,916,286 A | 6/1999 | Seashore et al. |
| 6,061,003 A | 5/2000 | Harada |
| 6,141,608 A | 10/2000 | Rother |
| 6,237,400 B1 | 5/2001 | Takakura et al. |
| 6,256,558 B1 | 7/2001 | Sugiura et al. |
| 6,295,492 B1 | 9/2001 | Lang et al. |
| 6,330,558 B1 * | 12/2001 | Soeder ........................ 369/30.01 |
| 6,385,542 B1 | 5/2002 | Millington |
| 6,546,334 B1 | 4/2003 | Fukuchi et al. |
| 6,574,537 B2 | 6/2003 | Kipersztok et al. |
| 6,636,790 B1 * | 10/2003 | Lightner et al. ................ 701/33 |
| 6,691,128 B2 | 2/2004 | Natesan et al. |
| 6,807,469 B2 | 10/2004 | Funkhouser et al. |

(Continued)

FOREIGN PATENT DOCUMENTS

DE 19507959 C1 7/1996
DE 101 20 465 A1 11/2002

(Continued)

OTHER PUBLICATIONS

Extended European Search Report in corresponding Application No. EP 10 01 0729, Dated Jan. 20, 2011, 7 pages.

*Primary Examiner* — Tuan C. To
(74) *Attorney, Agent, or Firm* — Finnegan, Henderson, Farabow, Garrett & Dunner, L.L.P.

(57) ABSTRACT

To use the same onboard apparatus and navigation system in many kinds of vehicles. A table in which manufacturers and vehicle types are connected with designs and functions has been previously stored in a navigation system module 21. The navigation system module 21 itself sends the center controller 11 a query about vehicle information (the country that manufactured, manufacturer, vehicle type, using country, manufacturing number), recognizes the vehicle information supplied from the center controller 11, and automatically sets the screen design, function, etc., suitable to the vehicle on which the onboard apparatus is mounted.

8 Claims, 9 Drawing Sheets

U.S. PATENT DOCUMENTS

| | | | |
|---|---|---|---|
| 6,886,060 B2* | 4/2005 | Wang et al. | 710/72 |
| 7,010,744 B1 | 3/2006 | Torgerson | |
| 7,085,702 B1 | 8/2006 | Hwang et al. | |
| 7,467,074 B2* | 12/2008 | Faruque et al. | 703/8 |
| 2001/0007086 A1 | 7/2001 | Rogers et al. | |
| 2001/0040505 A1 | 11/2001 | Ishida et al. | |
| 2002/0038182 A1 | 3/2002 | Wong et al. | |
| 2002/0077781 A1 | 6/2002 | Liebl et al. | |
| 2002/0099520 A1 | 7/2002 | Falada et al. | |
| 2002/0174427 A1 | 11/2002 | Kohno et al. | |
| 2002/0193926 A1* | 12/2002 | Katagishi et al. | 701/33 |
| 2002/0193966 A1* | 12/2002 | Buote et al. | 702/183 |
| 2002/0197955 A1* | 12/2002 | Witkowski et al. | 455/41 |
| 2003/0055552 A1 | 3/2003 | Akins et al. | |
| 2003/0093199 A1 | 5/2003 | Mavreas | |
| 2003/0097211 A1* | 5/2003 | Carroll et al. | 701/33 |
| 2003/0114965 A1 | 6/2003 | Fiechter et al. | |
| 2003/0114980 A1 | 6/2003 | Klausner et al. | |
| 2003/0182083 A1* | 9/2003 | Schwenke et al. | 702/183 |
| 2003/0200015 A1 | 10/2003 | Pillar | |
| 2003/0212481 A1* | 11/2003 | Fuller | 701/36 |
| 2004/0002812 A1 | 1/2004 | Yamanaka | |
| 2004/0034453 A1* | 2/2004 | Funk | 701/1 |
| 2004/0044990 A1 | 3/2004 | Schloegel et al. | |
| 2004/0068350 A1 | 4/2004 | Tomson | |
| 2004/0093183 A1* | 5/2004 | Seel | 702/183 |
| 2004/0192189 A1* | 9/2004 | Yuhara et al. | 455/3.02 |
| 2004/0210363 A1* | 10/2004 | Katagishi et al. | 701/33 |
| 2004/0243348 A1* | 12/2004 | Minatani | 702/183 |
| 2005/0004747 A1 | 1/2005 | Abe | |
| 2005/0137762 A1* | 6/2005 | Rother | 701/29 |
| 2005/0182535 A1 | 8/2005 | Huang | |
| 2005/0203684 A1* | 9/2005 | Borgesson | 701/36 |

FOREIGN PATENT DOCUMENTS

| | | |
|---|---|---|
| FR | 2812437 A1 | 2/2002 |
| JP | 10-208194 | 8/1998 |
| JP | 10-275044 | 10/1998 |
| JP | 10-278703 | 10/1998 |
| JP | 2000-266557 | 9/2000 |
| JP | 2002-122441 | 4/2002 |
| JP | 2003-101552 | 4/2003 |
| WO | WO 02/33355 A2 | 4/2002 |

* cited by examiner

| MANUFACTURER | VEHICLE TYPE | USING COUNTRY | DESIGN | FUNCTION |
|---|---|---|---|---|
| A | a1 | α | d-type1 | f-type1 |
| ● | ● | ● | ● | ● |
| ● | ● | ● | ● | ● |
| ● | ● | ● | ● | ● |
| A | a8 | β | d-type2 | f-type2 |
| B | b1 | α | d-type3 | f-type3 |
| B | b1 | β | d-type4 | f-type3 |
| B | b2 | ε | d-type5 | f-type4 |
| ● | ● | ● | ● | ● |
| ● | ● | ● | ● | ● |
| ● | ● | ● | ● | ● |
| B | b5 | ω | d-type6 | f-type5 |
| C | c1 | α | d-type7 | f-type6 |
| ● | ● | ● | ● | ● |
| ● | ● | ● | ● | ● |
| ● | ● | ● | ● | ● |

ONBOARD APPARATUS, NAVIGATION SYSTEM, AND METHOD FOR SETTING DISPLAY SCREEN

BACKGROUND OF THE INVENTION

1. Field of the Invention

This invention relates to an onboard apparatus and the like to be mounted on vehicles such as personal vehicles and business vehicles, and more particularly, to an onboard apparatus and the like to be mounted on the vehicle in the manufacturing process.

2. Description of the Related Art

The movement to aim at the improvement of assembly performance in manufacturing process and lowering in cost by modulizing parts forming a vehicle, such as doors and an instrument panel, has becoming remarkable. Also the techniques to modulize onboard apparatuses such as audio systems, air conditioners and navigation systems have been provided (see Japanese Patent Application Laid-open No. 10-275044 (p. 2) and Japanese Patent Application Laid-open No. 10-278703 (p. 2))

In the case where a navigation system is modulized, the navigation system is taken in an instrument panel. Therefore, the external appearance and the dimension are standardized similarly to the present audio systems. Also in the case where the navigation system is modulized, it is expected that the required function and display design are different depending on the kind of the vehicle on which it is mounted (for example, high-class vehicle or economy vehicle). More particularly, since the display part (screen) of the navigation system is large as 6.5-8 inches, it has a large effect on the design of an instrument panel, that is, the atmosphere of the interior of the vehicle. Therefore, it can be considered to prepare a dedicated navigation system having a different display design for each vehicle type.

However, to prepare a dedicated navigation system for each vehicle type, the derivative models of the navigation system must be prepared by the number of vehicle types; it causes a complexity in the manufacturing process. Also, there is a problem that preparing a derivative model for each vehicle type increases the costs of design and manufacturing management and stock management.

SUMMARY OF THE INVENTION

In view of the foregoing, an object of this invention is to use the same onboard apparatus and navigation system in many kinds of vehicles.

Another object of the present invention is to inform the user of vehicle recall information.

The foregoing objects and other objects of the invention have been achieved by the provision of an onboard apparatus (navigation system) which itself recognizes the vehicle type of the vehicle on which the navigation system is mounted, and displays information corresponding to the design and function that are peculiar to the recognized vehicle type.

Specifically, the present invention provides an onboard apparatus to be mounted on a vehicle, for obtaining vehicle information being the information peculiar to the vehicle by obtaining means, recognizing the kind of the vehicle by recognition means based on the vehicle information obtained by this obtaining means, and displaying information corresponding to the design peculiar to the vehicle and/or the function peculiar to the vehicle on display means such as a display, based on the recognition result by this recognition means.

Here, the vehicle information can be characterized by including at least some one of the manufacturer, the country that manufactured, the using country, the vehicle type and the manufacturing number, of the vehicle. The obtaining means can be characterized by obtaining the vehicle information from the center controller provided in the vehicle. The obtaining means can be characterized by obtaining the vehicle information based on the shape of a connector to attach the onboard apparatus to the vehicle or the formed position of the connector. Furthermore, the onboard apparatus can be characterized by receiving recall information by receiving means, determining whether or not the above vehicle is the vehicle to be recalled by the determination means, by the above recall information received by the receiving means and the kind of the above vehicle recognized by the above recognition means, and if it is determined that the above vehicle is the vehicle to be recalled by this determination means, displaying the recall information on the above display means.

On the other hand, the present invention provides a navigation system to be mounted on a vehicle, for performing a route guide to the user, and for storing a table in that plural vehicle types are connected with screen design to perform a route guide in a storage part, comparing the vehicle type of the vehicle on which the navigation system is mounted to the table by a comparison part, and setting a screen design corresponding to the vehicle type of the vehicle by a design setting part based on the comparison result by the comparison part. Here, the design setting part can be characterized by setting a different screen design for the vehicle in that the driver sits on the left side in the line from a design for the vehicle in that the driver sits on the right side in the line.

Gripping from another angle, the present invention provides a navigation system to be mounted on a vehicle, for performing a route guide to the user, and for storing a table in that each of plural vehicle types is connected with a function necessary for the vehicle type in a storage part, comparing the vehicle type of the vehicle on which the navigation system is mounted to the table by a comparison part, and setting a function corresponding to the vehicle type of the vehicle in a function setting part based on the comparison result by the comparison part. Here, the function setting part can be characterized by setting also functions other than the route guide.

Furthermore, the present invention provides a display screen setting method for setting a screen to be displayed on a display system mounted on a vehicle, and it also can be grasped as the invention of the method including the first step for obtaining vehicle information being the information peculiar to the vehicle on which the navigation system is mounted, and the second step for setting a screen design to be displayed on the screen and/or a function based on the obtained vehicle information. Here, the first step can be characterized by obtaining at least some one of the manufacturer, the country that manufactured, the using country, the vehicle type and the manufacturing number, of the vehicle as the vehicle information.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

Embodiment 1

Figure 1:
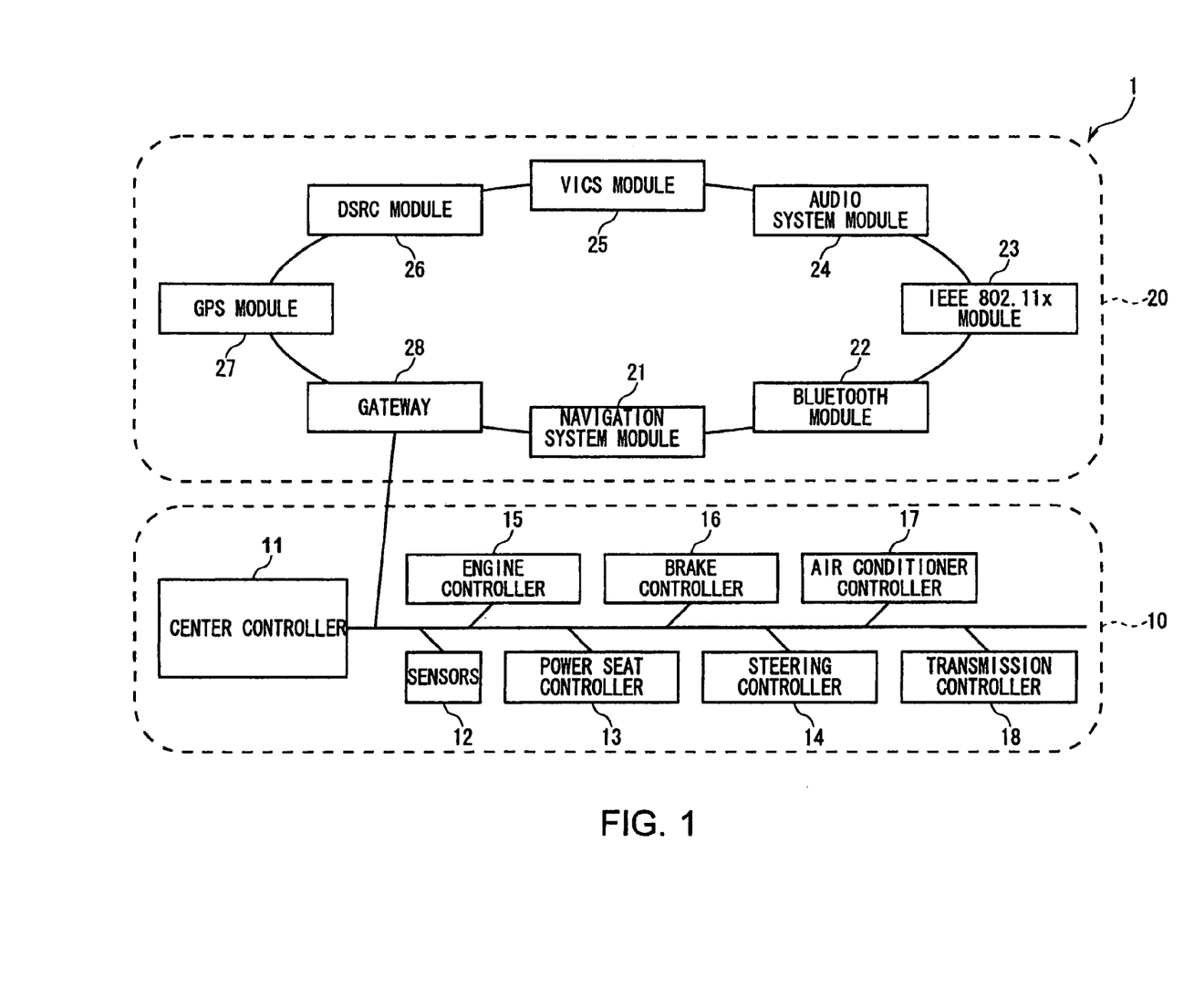
FIG. 1 is a diagram for explaining an in-vehicle network system including an onboard apparatus applying this Embodiment 1.

FIG. 1 is a diagram for explaining an in-vehicle network system 1 including an onboard device applying this embodiment (in this embodiment, navigation system). This in-vehicle network system 1 has a controller area network (CAN) 10 being one of the network standards of control systems and a media oriented system transport (MOST) 20 being one of the network standards of multimedia systems. The MOST 20 is connected to the CAN 10 via a gateway 28. Note that, in this embodiment, the CAN 10 is adopted as control system network, however, it is also possible to adopt a local interconnect network (LIN) being one of the other network standards of control systems.

Here, the CAN 10 is a network having a bus type topology, and in which the center controller 11, various sensors 12 installed in a vehicle, a power seat controller 13 for controlling the positions and the angles of seats, a steering controller 14 for controlling steering, an engine controller 15 for controlling an engine, a brake controller 16 for controlling the brakes, an air-conditioning controller 17 for controlling air-conditioning, and a transmission controller 18 for controlling a transmission are connected therein. The power seat controller 13, the steering controller 14, the engine controller 15, the brake controller 16, the air-conditioning controller 17 and the transmission controller 18 are integratedly controlled by the center controller 11, based on various kinds of sensing information from the sensors 12 and instructions from the user.

On the other hand, the MOST 20 is a network having a ring type topology. In this embodiment, the MOST 20 has a navigation system module 21 for performing a route guide or the like to the user, a Bluetooth module 22 for performing short-distance wireless transmission at a predetermined radio frequency (2.45 GHz), an IEEE 802.11X module 23, for example, based on the standard of the IEEE 802.11b, for performing communication with a predetermined access point by means of a transmission line other than a cable, such as a radio wave and infrared rays, an audio system module 24 for reproducing, for example, a music CD and a DVD, a Vehicle Information and Communication System (VICS: Japanese real-time traffic information provided by the Vehicle Information and Communication System Center (VICS Center)) module 25 for obtaining traffic information such as accidents and traffic jams by means of beacons (information communication equipment) set up on roads, frequency modulation (FM) multiplex broadcasting or the like, a dedicated short range communication (DSRC) module 26 for performing high-speed bulk bidirectional communication by means of a narrowband communication system, a Global Positioning System (GPS) module 27 for receiving radio waves from at least three or more Global Positioning System (GPS) satellites, and measuring the position of the vehicle in two dimension (latitude, longitude), and a gateway 28 for connecting the MOST 20 to the CAN 10.

Figure 2:
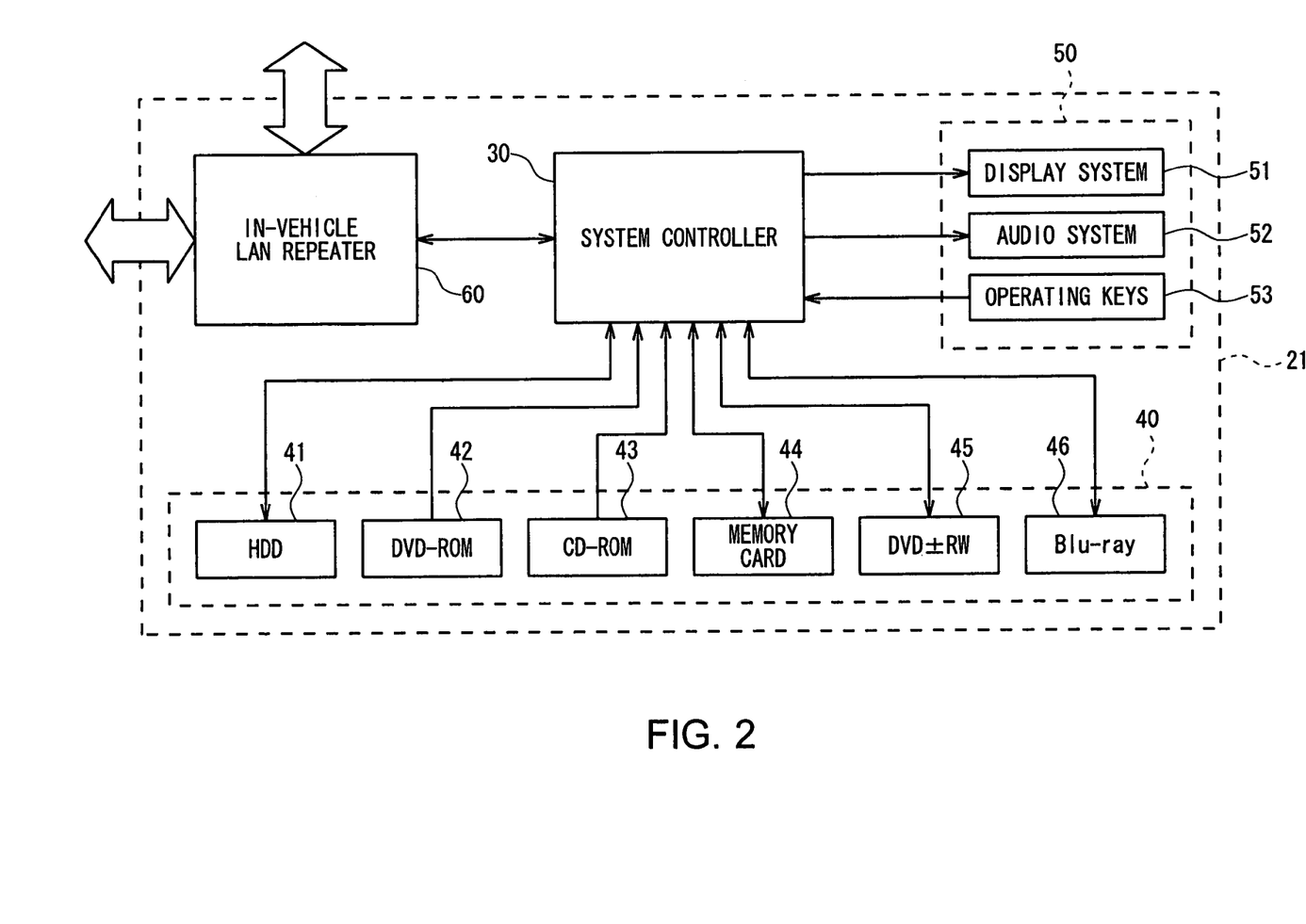
FIG. 2 is a block diagram for explaining the hardware configuration of a navigation system module.

FIG. 2 is a block diagram for explaining the hardware configuration of the navigation system module 21. The navigation system module 21 has a system controller 30 for controlling the whole navigation system module 21, a system part for reading map data, function and display design 40 for reading map data, navigation function, display design or the like from a predetermined storage medium, a user interface 50 for input by the user and a display of results or the like, and an in-vehicle LAN repeater 60.

In this embodiment, position measurement information and position measurement precision information on the present position can be obtained from the GPS module 27, VICS module 25 and DSRC module 26, that exist in the MOST 20 (see FIG. 1), via the in-vehicle LAN repeater 60, and map data on the corresponding area is read from the predetermined storage medium in the system part for reading map data, function and display design 40, according to this position measurement data. Here, the GPS module 27 is mostly used for the measurement of position measurement information and position measurement precision information. However, reception of VICS information by the VICS module 25 is taken together because if only the GPS module 27 is used, the error of position information often reaches the level that cannot be ignored due to the geographical factor of communication position. In this VICS, to provide the position of the communicating point, the shape of a crossroad and road traffic information that frequently changes, beacons which are devices for spot communication have been placed, for example, every 2-5 km on roads. Note that, the GPS module 27 and the VICS module 25 are provided only for receiving sent information, however, the use of the DSRC module 26, the Bluetooth module 22 and the IEEE 802.11X module 23 enables this system to perform bidirectional information transmission. Furthermore, the use of the IEEE 802.11X module 23 and the DSRC module 26 enables this system to perform high-speed bulk bidirectional communication, so that the update of map information and the supply of music and video information to the audio system module 24 can be further simplified. Moreover, the use of the Bluetooth module 22 enables this system to perform information exchange with personal digital assistants (PDAs), cellular phones, or the like, that support Bluetooth.

The system part for reading map data, function and display design 40 can provide a hard disk drive (HDD) 41 which has been widely used as a magnetic recording medium, a DVD-ROM 42 and a CD-ROM 43 being optical disks, a memory card 44 being a recording medium using a semiconductor memory, a DVD±RW 45 being a rewritable optical disk usable as both media of a DVD+R/RW and a DVD-R/RW, a Blu-ray 46 being the next generation of optical disk, or the like, as recording media. One of them can be used or two of them may be used by combining.

The user interface 50 provides a display system 51 for performing the display output of the map data, navigation function and the display design read from the system part for reading map data, function and display design 40 to provide the information to the user (driver etc.), an audio system 52 for the audio output of guides and cautions to the user, and operating keys 53 for receiving various inputs by the user.

Figure 3A:
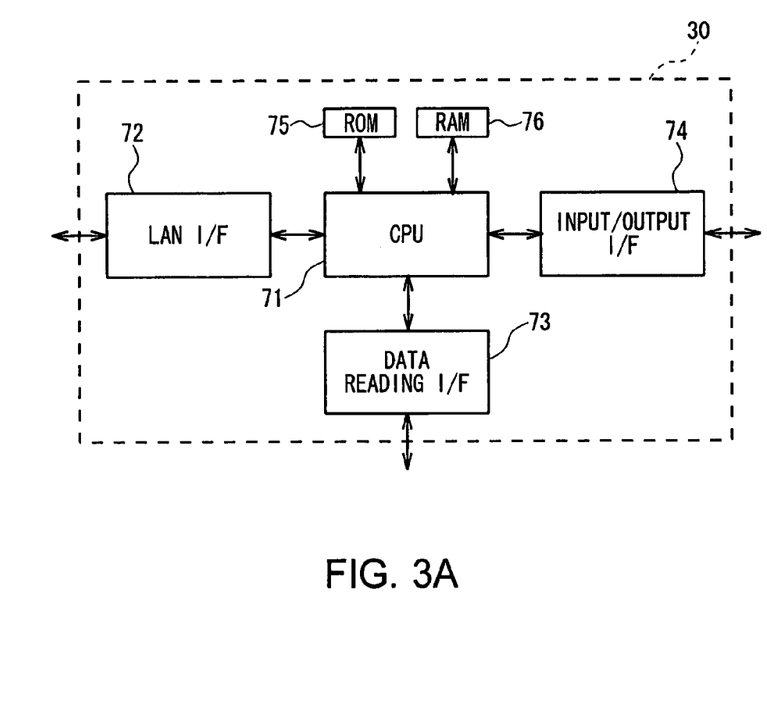
FIGS. 3A and 3B are block diagrams for explaining the hardware configurations of a system controller and the center controller, respectively.

FIG. 3A is a block diagram for explaining the hardware configuration of the system controller 30. The system controller 30 provides a LAN interface (I/F) 72 for receiving a variety of position information from various elements (for example, the GPS module 27) forming the CPU 71 for executing a variety of processing and the MOST 20, and vehicle information from the center controller 11 forming the CAN 10, a data reading interface (I/F) 73 for reading map data, navigation function data and display design data, read by the system part for reading map data, function and display design 40, and an input/output interface (I/F) 74 being the interface for the input of user instructions and the output of display and audio with the user interface 50. Additionally, the system controller 30 provides a ROM 75 storing a program to be executed by the CPU 71 or the like, and a RAM 76 being a work buffer when the CPU 71 executes the processing.

Figure 3B:
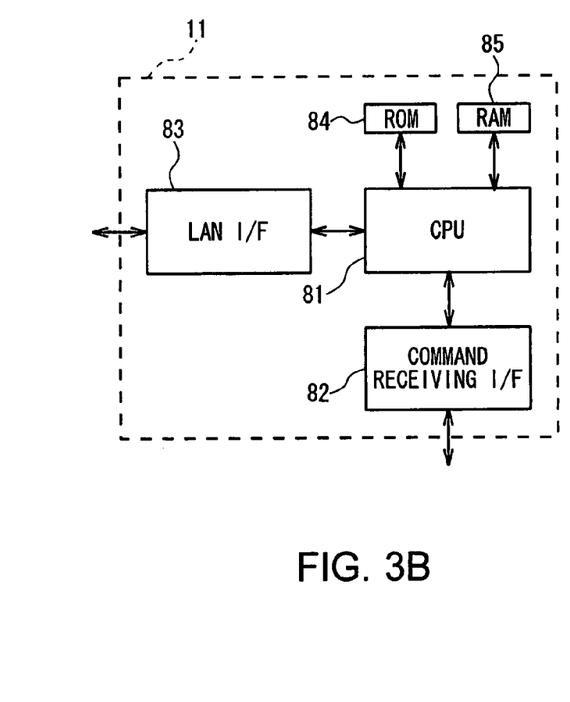

On the other hand, FIG. 3B is a block diagram for explaining the hardware configuration of the center controller 11. The center controller 11 provides a CPU 81 for executing a variety of processing, a command receiving interface (I/F) 82 for receiving commands from the user, and a LAN interface (I/F) 83 for sending information to the CAN 10 and the MOST 20. Additionally, the center controller 11 provides a ROM 84 storing a program to be executed by the CPU 81 or the like, and a RAM 85 being a work buffer when the CPU 81 executes the processing.

Figure 4:
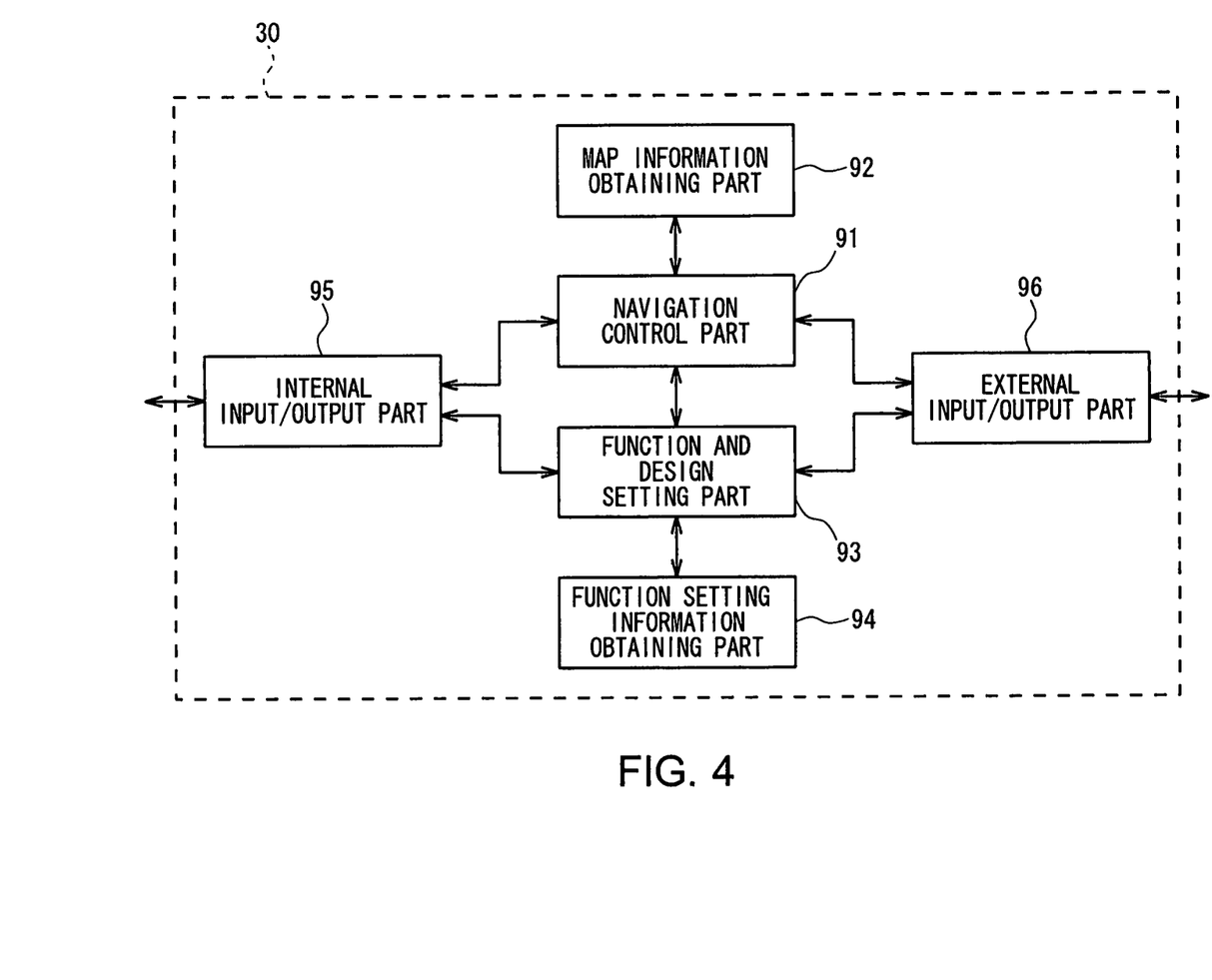
FIG. 4 is a block diagram for explaining the function of the system controller.

FIG. 4 is a block diagram for explaining the function of the system controller 30. The system controller 30 has a navigation control part 91 for performing the control to realize the so-called navigation function such as a route guide, a map information obtaining part 92 for obtaining map information according to the request from this navigation control part 91, a function and design setting part 93 for setting the navigation function and the design of a navigation screen to be displayed on the display system 51 according to vehicle information that will be described later, a function setting information obtaining part 94 for obtaining function setting information according to the request from this function and design setting part 93, an internal input/output part 95 for sending/receiving data to/from the CAN 10 and the MOST 20, and an external input/output part 96 for sending/receiving data to/from the user interface 50. Note that, referring to the configuration shown in FIG. 4, the internal input/output part 95 is realized by the LAN interface 72, the external input/output part 96 is by the input/output interface 74, and the map information obtaining part 92 and the function setting information obtaining part 94 are by the data reading interface 73. Furthermore, the navigation control part 91 and the function and design setting part 93 are a software block realized by the CPU 71.

In this embodiment, the navigation system module 21 itself automatically changes the design of a screen to be displayed on the display system 51 and various functions including the navigation function, depending on the vehicle in that this navigation system module 21 is installed. Such setting processing is performed when the switch of the vehicle was turned on: concretely, when the user turned the ignition key.

Figure 5:
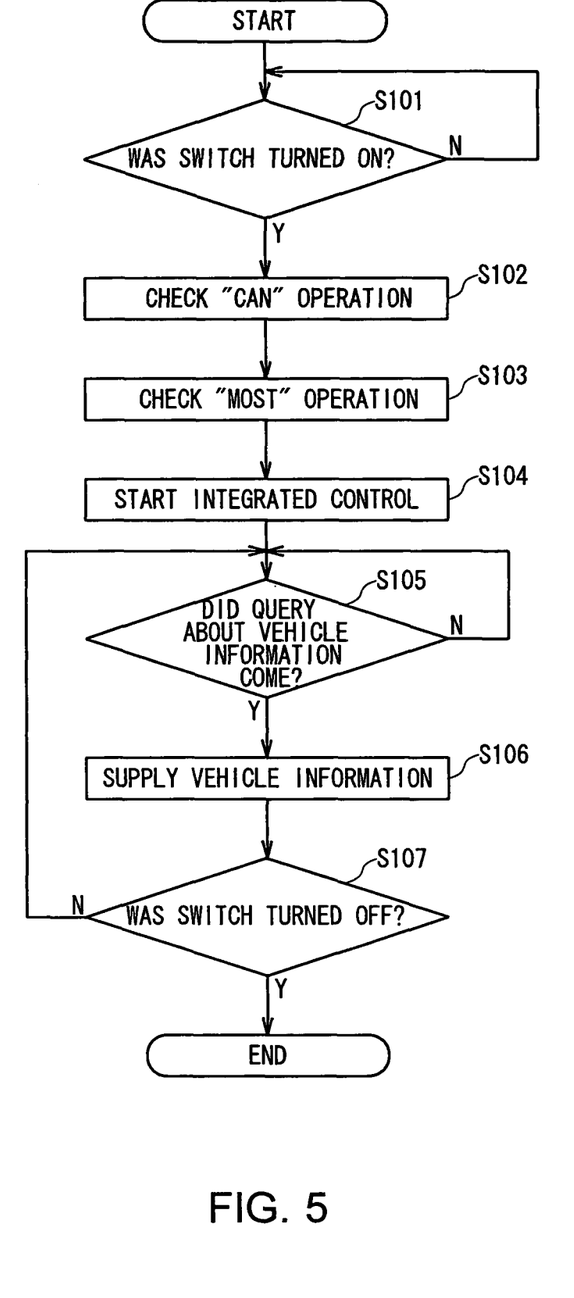
FIG. 5 is a flowchart showing the flow of initial setting processing in the center controller.

FIG. 5 is a flowchart showing the flow of initial setting processing in the center controller 11. Here, the CPU 81 first determines whether or not the switch was turned on (step S101). If the switch was turned on, next, the CPU 81 performs the operation checks of the center controller 11, sensors 12, power seat controller 13, steering controller 14, engine controller 15, brake controller 16, air-conditioning controller 17 and transmission controller 18 that are components of the CAN 10 (step S102). On the contrary, if the switch has not been turned on, the CPU 81 returns to step S101 to await that the switch is turned on. In step S102, after finished the operation check of the CAN 10, the CPU 81 performs the operation checks of the navigation system module 21, Bluetooth module 22, IEEE 802.11X module 23, audio system module 24, VICS module 25, DSRC module 26, GPS module 27 and gateway 28 that are components of the MOST 20 (step S103). And then, in step S103, after finished the operation check of the MOST 20, the CPU 81 starts integrated control (step S104). The CPU 81 determines whether or not a query about vehicle information came from the navigation system module 21 that will be described later, during the integrated control (step S105). If the query came, the CPU 81 supplies the vehicle information to the navigation system module 21 (step S106). On the contrary, if a query does not come, the CPU 81 returns to step S1.05. And then, the CPU 81 determines whether or not the switch was turned off (step S107). If the switch was turned off, the CPU 81 finishes the processing, and if the switch has not been turned off, the CPU 81 returns to step S105 to continue the processing.

Here, the vehicle information means the information allotted to each vehicle and peculiar to the vehicle, and it includes for example, the manufacturer, the country that manufactured, the using country, the vehicle type, the manufacturing number, etc., of this vehicle. This vehicle information has been previously stored in the ROM 84 in the center controller 11 (see FIG. 3B). For example, the manufacturer, country that manufactured, using country, and vehicle type can be expressed by a model, and the manufacturing number can be expressed by a vehicle number.

Figure 6:
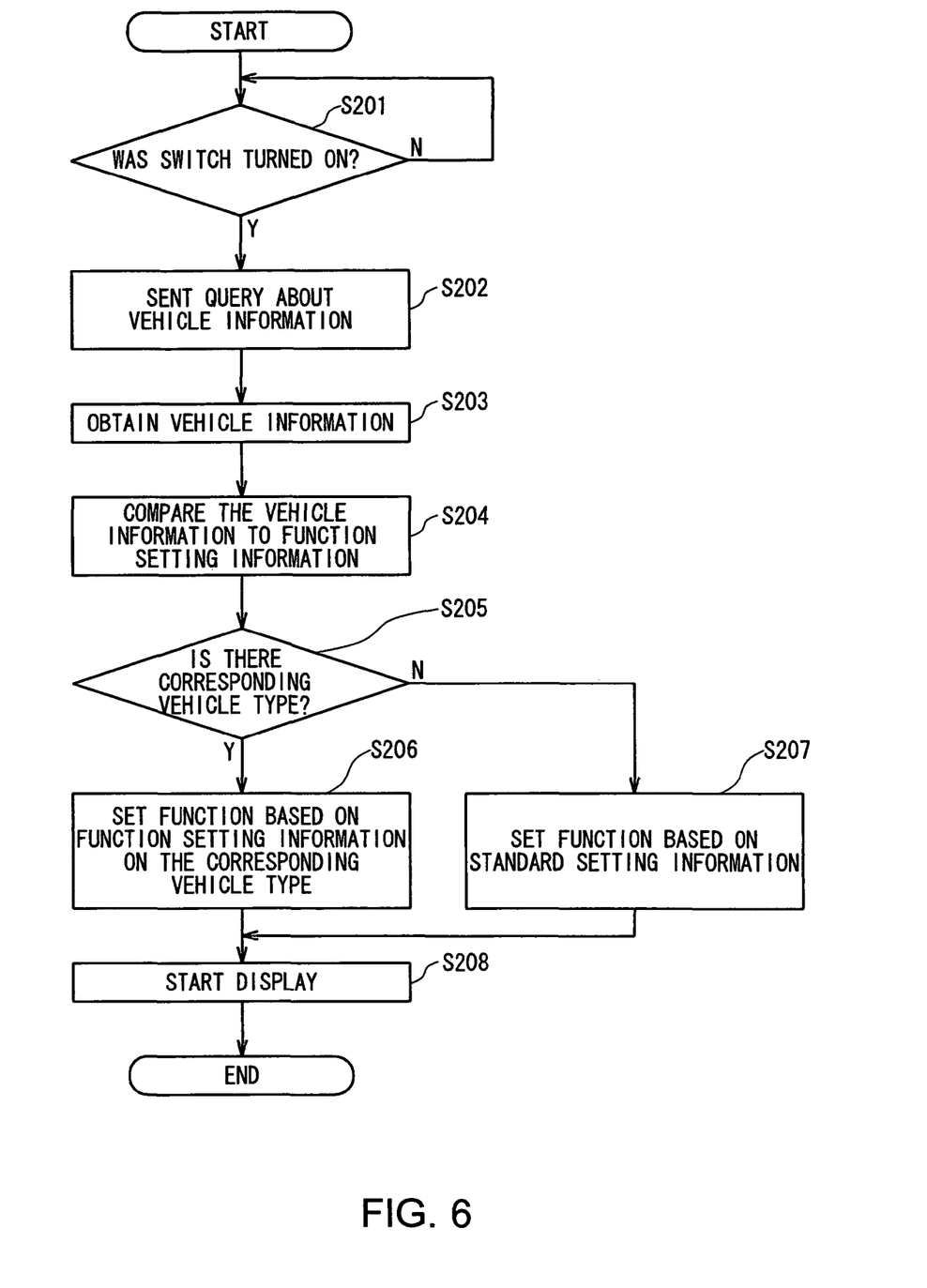
FIG. 6 is a flowchart showing the flow of initial setting processing in the navigation system module.

FIG. 6 is a flowchart showing the flow of initial setting processing in the navigation system module 21. This is processing to be performed in the system controller 30 serving as one of obtaining means or recognition means. Also here, the CPU 71 first determines whether or not the switch was turned on (step S201). If the switch was turned on, next, the CPU 71 sends a query about vehicle information (step S202). This query about vehicle information is supplied to the center controller 11 from the navigation system module 21 via the gateway 28 in the MOST 20. On the contrary, if the switch has not been turned on, the CPU 71 returns to step S201 to await that the switch is turned on. After sent the query in step S202, the CPU 71 obtains the vehicle information replied from the center controller 11 via a reverse route to the query (step S203), and compares the obtained vehicle information to function setting information by the function and design setting part 93 serving as a comparison part (step S204). Here, the function setting information is formed by connecting each vehicle type of each maker with each function such as a screen design, a navigation function, etc., and it has been stored, for example, in the hard disk drive 41 serving as one of storage parts. The CPU 71 determines whether or not a corresponding vehicle type was found, specifically, whether or not function setting information corresponding to the obtained vehicle information exists (step S205). If a corresponding vehicle type was found, the CPU 71 sets the color pattern of the screen and the function by the function and design setting part 93 serving as one of design setting parts and function setting parts, based on the function setting information on the corresponding vehicle type (step S206). On the contrary, if the corresponding vehicle type was not found, the CPU 71 sets the screen design and the function based on standard setting information (step S207). After set the screen design and the function in step S206 or S207, the CPU 71 starts a display on the display system 51 serving as one of display means based on the set color pattern of the screen and function (step S208), and finishes the initial setting processing.

Figure 7:
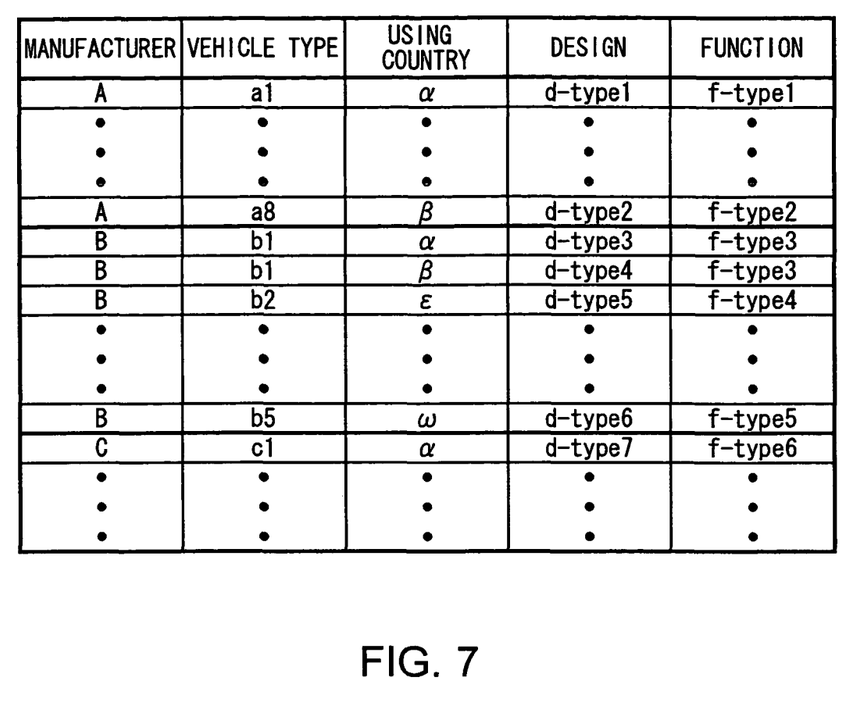
FIG. 7 is a diagram showing an example of the table of function setting information.

FIG. 7 shows an example of the function setting information compared in the aforementioned step S204. In this example, the function and setting information has been stored in the hard disk drive 41 as the table in that the manufacturer, vehicle type and using country are connected with the design and function. These design and function have been decided by previously arranging with the vehicle maker. Therefore, in the case where such arrangement has not been done, a standard design and a standard function are set in step S207. Note that, here, the "design" means concepts including the layout of a screen, the shape of the operating keys 53, the color pattern, etc.

It will be described by giving a concrete example. For instance, if the vehicle information obtained by the center controller 11 in step S203 is "manufacturer A, vehicle type a1, using country α", in step S206, design d-type1, function f-type1 are set. Here, if the vehicle type a1 of the manufacturer A is for example a high-class vehicle, the design d-type1 becomes a luxury one fitting for high-class vehicles. Also, for instance, the name and the mark of the manufacturer A and the vehicle type a1 can be displayed on the start-up screen. Furthermore, if the using country α is a lefthand drive country, the user (driver) sitting on the right side in the line will operate the operating keys 53 displayed on the display screen of the display system 51 with the left hand. Therefore, the design d-type1 becomes the design in which the operating keys 53 are displayed on the right hand (driver side) by considering the operability. For instance, if the using country α is Japan, in the function f-type1, the language to be displayed on the display system 51 and the sounds to be emitted from the audio system 52 are set to Japanese. Furthermore, if the vehicle type a1 of the manufacturer A is the high-class vehicle, as the function f-type1, the function is set so that in addition to the navigation screen, for example, a mileage measuring screen and a night-vision screen (obstacle detecting screen by infrared rays) can be displayed on the display system 51, as the functions peculiar to high-class vehicles.

Furthermore, for instance, in the case where the vehicle information obtained from the center controller 11 in step S203 is "manufacturer A, vehicle type a8, using country β", in step S206, design d-type2, function f-type2 are set. Here, for instance, in the case where the vehicle a8 of the manufacturer A is an economic vehicle, the design d-type2 becomes a popular design fitting for economic vehicles. Also, for instance, the name and the mark of the manufacturer A and the vehicle type a8 can be displayed on the start-up screen. Furthermore, if the using country β is a righthand drive country, the user (driver) sitting on the left side in the line will operate the operating keys 53 displayed on the display screen of the display system 51 with the right hand. Therefore, the design d-type2 becomes the design in which the operating keys 53 are displayed on the left hand (driver side) by considering the operability. For instance, if the using country β is the United States, as the function f-type2, the language to be displayed on the display system 51 and the sounds to be emitted from the audio system 52 are set to English. Furthermore, if the vehicle type a8 of the manufacturer A is an economic vehicle, as the function f-type1, the function is set so that only navigation screen can be displayed on the display system 51.

Also in the case where a vehicle type of manufacturers B or C, other than the manufacturer A was selected, the settings of the design and the function are performed similarly.

In this manner, in this embodiment, the table in which the manufacturer and vehicle type are connected with the design and function has been previously installed in the navigation system module 21, and the navigation system module 21 itself recognizes the vehicle information (country that manufactured, manufacturer, vehicle type, using country, manufacturing number) supplied from the center controller 11, and automatically sets the screen design and the function fitting for the vehicle on which the navigation system is mounted. Thereby, one type of navigation system module 21 can be used in many kinds of vehicles. Therefore, it becomes unnecessary to prepare derivative models of the navigation system module 21 for each of various vehicle types; the costs of design and manufacturing management and stock management can be reduced.

Embodiment 2

This embodiment is almost similar to Embodiment 1, however, recall information on vehicles can be informed the user. Note that, in this embodiment, the description of the parts similar to Embodiment 1 will be omitted by adding the same reference numerals as Embodiment 1.

The recall information on vehicles is aiming at preventing accidents by defective vehicles and protecting automobile users and others, and it means the information released in the system that in the case where the structure, equipment or performance of automobiles in a certain range of the same model made or imported by the automobile maker (manufacturer) or the like are not conforming or are likely not to conform to the rules on automobile safety and to prevent pollution (vehicle safety standard on road traffic), and it caused in the design process or the manufacturing process, the automobile maker (manufacturer) or the like notifies the Ministry of Land, Infrastructure and Transport (Government of Japan) of that, and calls in the automobiles and repairs free.

Figure 8:
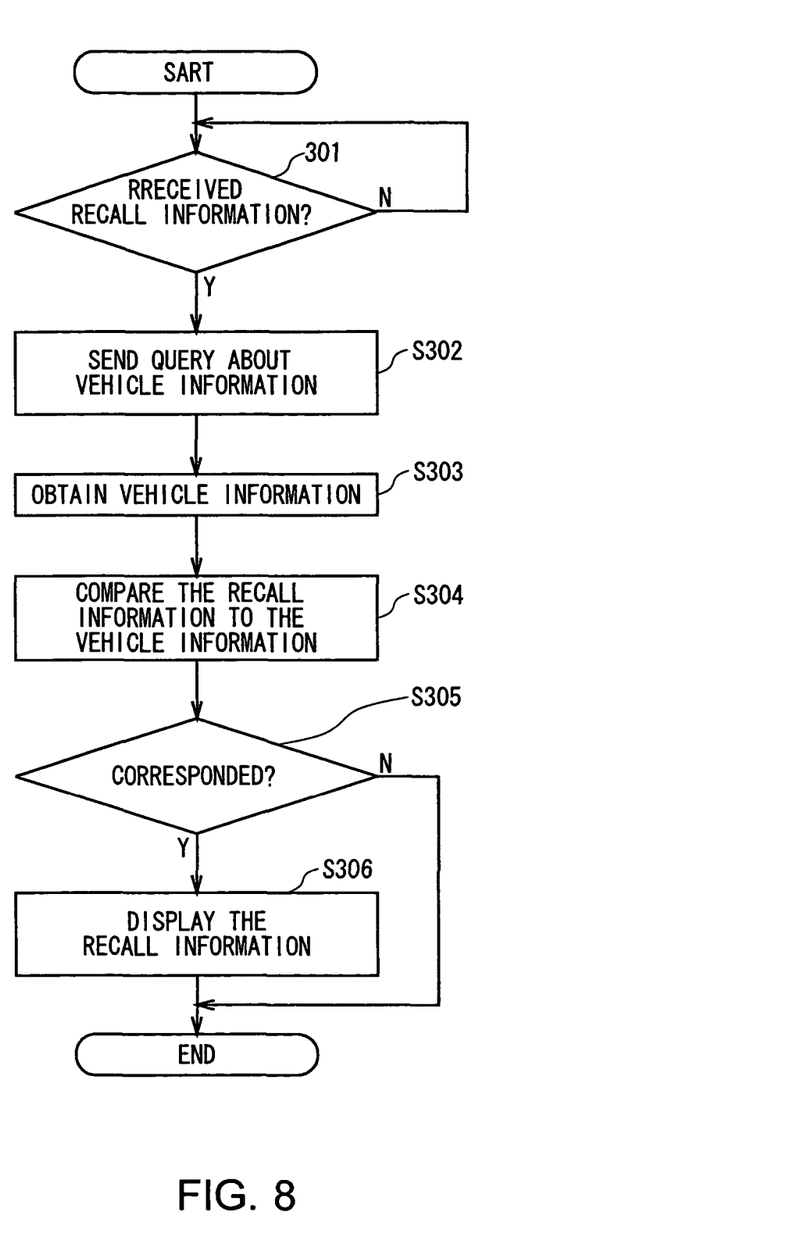
FIG. 8 is a flowchart showing the flow of processing in the navigation system module in Embodiment 2.

FIG. 8 is a flowchart showing the flow of processing in the navigation system module 21 in Embodiment 2. Note that, in this description, it is defined that the recall information is received from the outside via the DSRC module 26, the Bluetooth module 22 and the IEEE 802.11X module 23 that serve as one of receiving means. Furthermore, it is defined that the recall information includes manufacturer, vehicle type (model), manufacturing number (vehicle number) and the contents of recall. First, the CPU 71 determines whether or not the navigation system module 21 received recall information (step S301). If it received the recall information, next, the CPU 71 sends a query about vehicle information (step S302). This query about vehicle information is supplied from the navigation system module 21 to the center controller 11 via the gateway 28 and the MOST 20. On the contrary, if recall information has not been received, the CPU 71 returns to step S301 to await receiving of recall information. After sent the query in step S302, the CPU 71 obtains the vehicle information that was replied from the center controller 11 via a reverse route to the query (step S303), and compares the obtained vehicle information to the recall information (step S304) to determine whether or not this vehicle corresponds to the recall object, that is, the obtained vehicle information corresponds to the recall information (step S305). If it corresponds, the CPU 71 displays the recall information on the display system 51 (step S306) and finishes the processing, and if it does not correspond, the CPU 71 finishes the processing without displaying.

In this manner, in Embodiment 2, by using that the navigation system module 21 can send the center controller 11 the query about vehicle information, if this vehicle is the vehicle to be recalled, that is displayed on the display system 51 by the vehicle information and the received recall information. Thereby, the user can know that this vehicle is the vehicle to be recalled immediately.

Embodiment 3

Figure 9:
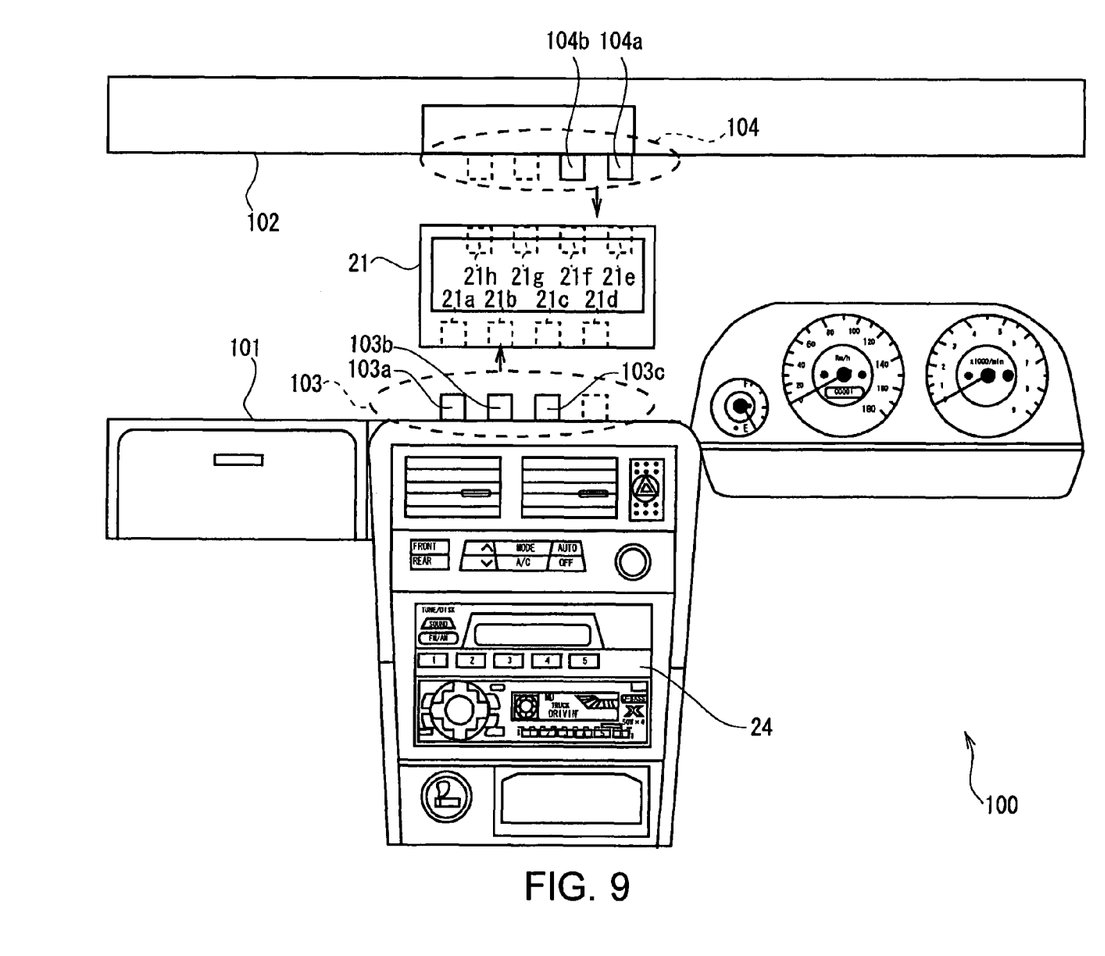
FIG. 9 is a diagram illustrating a navigation system module in Embodiment 3, and a cockpit module in a vehicle on which this navigation system module is mounted.

FIG. 9 is a diagram illustrating a navigation system module 21 of Embodiment 3 and a cockpit module 100 in a vehicle in that this navigation system module 21 is mounted. Recently, it has been provided that as a part of common use of modules among plural vehicle types, the cockpit module 100 is separated into the upper part and the lower part, concretely, into a lower cockpit module 101 and an upper cockpit module 102. Here, in the lower cockpit module 101, main parts (modules) such as the navigation system module 21, an audio system module 24, an air conditioner, a meter unit and a glove compartment, are contained, and in the upper cockpit module 102, only instrument panel is formed. And the lower cockpit module 101 is commonly used among plural vehicle types, and the upper cockpit module 102 is changed according to the vehicle type. By adopting such scheme, there is the advantage that the cost can be reduced by commonly using modules and various interior designs can be provided in various vehicle types.

In this embodiment, recessed parts 21a-21h are previously formed, four of them at the upper part and four of them at the lower part of the navigation system module 21. Pins 103 to be fitted in the recessed parts 21a-21d (in this embodiment, three pieces of pins 103a-103c) are erectly provided as occasion demands on the attaching part of the navigation system module 21 to the lower cockpit module 101, and pins 104 to be fitted in the recessed parts 21e-21h (in this embodiment, two pieces of pins 104a and 104b) are erectly provided as occasion demands on the attaching part of the navigation system module 21 to the upper cockpit module. And it is designed so that in the navigation system module 21, the number and the positions of the pins 103 and 104 fitted in the recessed parts 21a-21h can be detected. Specifically, these recessed parts 21a-21h and pins 103 and 104 work as one of connectors. Here, for instance, if it is designed so that the information about the manufacturer of the vehicle, the position of the steering wheel, etc., can be obtained by the number and the position of the pins 103 fitted in on the lower cockpit module 101, and the information about the vehicle type and the color of the interior can be obtained by the number and the position of the pins 104 fitted in on the upper cockpit module 102 side, similarly to Embodiment 1, one kind of navigation system module 21 can be used in many kinds of vehicles.

According to the present invention as described above, the same onboard apparatus and navigation system can be used in many kinds of vehicles.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An onboard apparatus mounted on a vehicle, comprising:
    getting means for automatically getting vehicle model information from the vehicle by determining a shape of a connector used to attach the onboard apparatus to the vehicle, the vehicle model information being peculiar to the vehicle;
    storage means for storing the vehicle model information and design information, the design information comprising at least one of a layout of a screen, a shape of operating keys, and a color pattern;
    recognition means for recognizing the vehicle model, based on the vehicle information obtained by the getting means;
    design setting means for setting the design information, the setting of the design information being at least partially based on the vehicle model information; and
    display means for displaying the design information set by the design setting means.

2. The onboard apparatus according to claim 1, wherein said vehicle model information comprises at least one of a manufacturer of the vehicle, a country that manufactured the vehicle, a using country of the vehicle, and a manufacturing number of the vehicle.

3. The onboard apparatus according to claim 1, wherein the storage means stores function setting information.

4. The onboard apparatus according to claim 3, wherein the function setting information comprises at least one of a navigation function, a mileage measuring function, and a night-vision function.

5. An onboard apparatus mounted on a vehicle, comprising:
    getting means for automatically getting vehicle model information from the vehicle by determining a formed position of a connector used to attach the onboard apparatus to the vehicle, the vehicle model information being peculiar to the vehicle;
    storage means for storing the vehicle model information and design information, the design information comprising at least one of a layout of a screen, a shape of operating keys, and a color pattern;
    recognition means for recognizing the vehicle model, based on the vehicle information obtained by the getting means;
    design setting means for setting the design information, the setting of the design information being at least partially based on the vehicle model information; and
    display means for displaying the design information set by the design setting means.

6. The onboard apparatus according to claim 5, wherein said vehicle model information comprises at least one of a manufacturer of the vehicle, a country that manufactured the vehicle, a using country of the vehicle, and a manufacturing number of the vehicle.

7. The onboard apparatus according to claim 5, wherein the storage means stores function setting information.

8. The onboard apparatus according to claim 7, wherein the function setting information comprises at least one of a navigation function, a mileage measuring function, and a night-vision function.

* * * * *